United States Patent [19]

Manabe et al.

[11] Patent Number: 4,927,446
[45] Date of Patent: May 22, 1990

[54] GLASS MELTING FURNACE

[75] Inventors: Seiichiro Manabe; Yukihito Nagashima, both of Osaka, Japan

[73] Assignee: Nippon Sheet Glass Co., Ltd., Osaka, Japan

[21] Appl. No.: 285,893

[22] Filed: Dec. 16, 1988

[30] Foreign Application Priority Data

Dec. 24, 1987 [JP] Japan ................................ 62-327892

[51] Int. Cl.$^5$ .............................................. C03B 5/033
[52] U.S. Cl. ................................... 65/347; 65/DIG. 4; 373/27; 373/134
[58] Field of Search ............ 65/347, 355, 356, DIG. 4, 65/335; 373/27, 134; 432/156, 209

[56] References Cited

U.S. PATENT DOCUMENTS

| 2,794,058 | 5/1957 | Russell | 65/356 |
| 2,891,303 | 6/1959 | Stevenson | 373/134 |
| 3,185,554 | 5/1965 | Sweo et al. | 373/27 |
| 3,248,191 | 4/1966 | Canfield | 65/DIG. 4 |
| 3,371,142 | 2/1968 | Soller | 65/DIG. 4 |
| 3,912,477 | 10/1975 | Brady et al. | 65/356 |
| 4,046,535 | 9/1977 | Stalego | 65/356 |
| 4,110,097 | 8/1978 | Chevallier et al. | 65/DIG. 4 |

Primary Examiner—Joye L. Woodard
Attorney, Agent, or Firm—Kanesaka and Takeuchi

[57] ABSTRACT

A vertical glass melting furnace provided with a material entrance at the uppermost portion and a molten glass exit provided at the lowermost portion. A resistance heating element 6 is provided over the substantially entire part of the horizontal section of the furnace at at least one level which is immersed in the molten glass.

5 Claims, 3 Drawing Sheets

GLASS MELTING FURNACE

BACKGROUND OF THE INVENTION

1. Field of the Invention and Related Art Statement

The present invention relates to a glass melting furnace and, more particularly, to a vertical electric furnace which is capable of producing high-quality glass with efficiency and stability.

A conventional vertical electric glass melting furnace generally has a structure in which a material entrance 1 is provided at the upper most portion of the furnace, a glass material (batch) 3 supplied to the surface of a molten glass 4 in the furnace is melted by heating the molten glass 4 by electricity directly passing through the glass by means of electrodes 5 which are immersed therein, and the molten glass after it is refined is conveyed to a working section from a glass exit 2 provided at the bottom portion of the furnace, as shown in FIGS. 4 to 6. The rod electrodes 5 may be horizontally inserted from the side wall of the furnace, as shown in FIG. 4, vertically inserted from the bottom portion of the furnace, as shown in FIG. 5, or inserted from the upper portion of the furnace through the layer of the glass material 3, as shown in FIG. 6.

In such an electric furnace, the surface of the molten glass 4 is covered with the layer of the glass material (batch) 3 so as to form what is called a "cold top" for the purpose of efficient utilization of thermal energy. The glass melts and is refined as it approaches the bottom of the furnace.

In order to obtain high-quality glass by such an electric furnace, it is necessary that the glass supplied to the working section through the exit 2 at the bottom portion of the furnace has a sufficient thermal history and does not contain any bubble or unmelted substance. The thermal history of the glass reaching the exit 2 is determined by the temperature of the glass in the furnace and the flow of the molten glass. Since the flow of the molten glass is mainly subject to the convection current caused by the temperature distribution of the glass in the furnace, the most important thing in the operation of the furnace for producing high-quality glass is to maintain the furnace in a stable thermal equilibrium.

It is difficult, however, to make the distribution of electric current uniform in the plane of the furnace in a conventional vertical electric furnace which utilizes the Joule heat produced on the glass by the rod electrodes for heating glass. Particularly, since the current density becomes high in the vicinity of the tip portions of the electrodes, the temperature of the glass between the tips of the electrodes is apt to be raised. Since the electric resistance of glass is reduced as the temperature thereof becomes higher, more and more current flows to the high-temperature portion, thereby disadvantageously furthering the local heating. Such a non-uniform temperature distribution causes convection current of the molten glass in the furnace and, as a result, the molten glass having a short thermal history, namely, the molten glass containing bubbles and unmelted substances due to the insufficient heating flows out of the exit, which is supplied to the working section and may cause a defect in the product.

In addition, the non-uniform temperature distribution and the convection current produced thereby on the molten glass lead to local melting of the batch on the surface of the molten glass, so that there produces some portions at which the molten glass is not covered with the batch layer, thereby increasing the heat loss and lowering the glass temperature. In a furnace for melting glass by heating it with Joule heat, the temperature control of the molten glass is very difficult for the above-described reasons. Thus, it is almost impossible to prevent the non-uniform temperature distribution of the molten glass.

These problems are serious in the case of melting glass which does not contain any alkaline component and, hence, has a large electric resistance. That is, since such a non-alkaline glass has a large electric resistance, it is necessary to reduce the distance between the electrodes in order to provide the power necessary for melting the glass, so that the non-uniform temperature distribution becomes more prominent.

OBJECTS AND SUMMARY OF THE INVENTION

Accordingly, it is an object of the present invention to provide a glass melting furnace which facilitates the control of heating.

It is another object of the present invention to provide a glass melting furnace which makes the temperature distribution in the plane of the molten glass uniform.

It is still another object of the present invention to provide a glass melting furnace in which the local convection of the molten glass is very small.

It is a further object of the present invention to provide a glass melting furnace which is capable of efficiently producing high-quality glass.

To achieve these aims, the present invention provides a glass melting furnace which has a material entrance at the uppermost portion thereof, a molten glass discharge at the lowermost portion thereof, and a resistance heating element provided over the substantially entire part of the horizontal section of the interior of the furnace at at least one level which is immersed in molten glass.

This resistance heating element may be a plate-like heating element having an opening. The resistance heating element may also be a plurality of rods horizontally arranged in parallel to each other.

In a glass melting furnace of the present invention, since molten glass is heated by the resistance heating element, control of heating is easy.

Since the heating element is provided over the substantially entire part of the horizontal section of the molten glass in the furnace, the temperature distribution in the plane of the molten glass becomes conspicuously uniform. In addition, since the heating element functions as the obstacle to the flow of convection, the convection is suppressed, and since the temperature is at its maximum at the surface portion of the heating element, and becomes lower toward the bottom of the furnace, convection of molten glass is prevented in the region lower than the heating element.

Thus, according to a glass melting furnace of the present invention, it is possible to produce high-quality glass with efficiency.

A glass melting furnace according to the present invention is applicable to any kind of glass under substantially the same conditions. In a conventional electric furnace, it is necessary to change the distance between the electrodes, the arrangement of the electrodes, the voltage applied to the electrodes, etc. in accordance with the electric resistance of the glass, namely, the kind of glass being melted, as described above. In contrast, a glass melting furnace according to the present invention can be universally used to any kind of glass.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
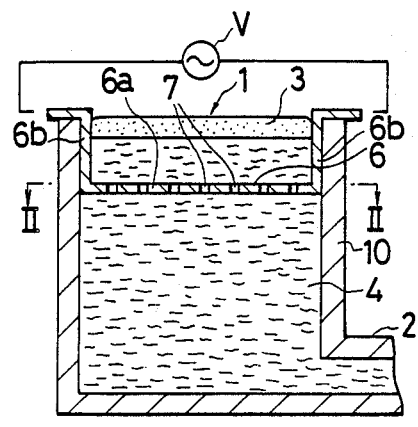
FIG. 1 is a vertical sectional view of an embodiment of a glass melting furnace according to the present invention.
Figure 2:
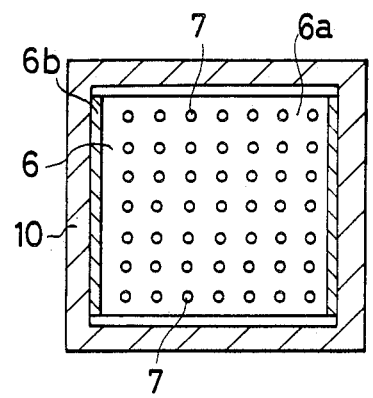
FIG. 2 is a sectional view of the embodiment shown in FIG. 1, taken along the line II—II.

In a glass melting furnace shown in FIGS. 1 and 2, a furnace body 10 made of brick has a square shape in a plan view and it is provided with a material entrance 1 at the upper portion thereof and a glass exit 2 (a throat protruding sideways in this embodiment) at the bottom portion thereof. The chamber of the furnace accommodates molten glass 4. A glass material (batch) 3 is uniformly supplied to the surface of the molten glass 4. A plate-like resistance heating element 6 is provided over the entire part of the horizontal section of the furnace at the level which is immersed in the molten glass 4. The plate-like resistance heating element 6 is provided with a plate-like heating portion 6a having a multiplicity of holes 7, and terminal portions 6b which rise from both ends of the heating portion 6a. The end portions of the resistance heating element 6 which are situated outside of the furnace are connected to a power source V.

When electric power is supplied on the resistance heating element 6 in the glass melting furnace having the above-described structure, the glass is heated. Since the resistance value of the resistance heating element 6 is determined in one-to-one correspondence with the temperature, it is possible to exactly generate a predetermined calorific value by supplying a predetermined magnitude of electric power. Since the heating portion 6a of the resistance heating element 6 is uniformly provided over the entire part of the horizontal surface of the furnace, the molten glass 4 is uniformly heated over the entire area of the horizontal surface and the temperature distribution of the molten glass becomes conspicuously uniform.

For these reasons, the correction of the molten glass due to the non-uniform temperature in the horizontal plane is prevented. In the molten glass 4 in the glass melting furnace, the temperature reaches its maximum at the portion at which the molten glass 4 comes into contact with the surface of the heating portion 6a, and becomes lower in proportion to the distance from the heating portion 6a. Therefore, almost no convection current of molten glass is produced on the underside of the heating portion 6a.

On the upper side of the heating portion 6a, since the temperature becomes lower toward the surface of the molten glass, convection current of molten glass 4 is produced. However, since the upper portion of the molten glass is separated from the lower portion thereof by the heating portion 6a, the convection current of molten glass on the upper side of the heating portion 6a is hardly transferred to the underside of the heating portion 6a.

The convection current of molten glass on the upper side of the heating portion 6a is very weak because the depth of the upper portion of the molten glass is made shallow by the partition of the heating portion 6a and the temperature distribution in the horizontal direction is uniform, thereby involving no fear of bringing about a problem such as local melting of the glass batch 3 and the exposure of the molten glass 4.

Thus, the glass melting furnace of this embodiment is capable of uniformly melting the glass batch 3 and reliably producing molten glass containing no bubbles and unmelted substance.

Figure 7:
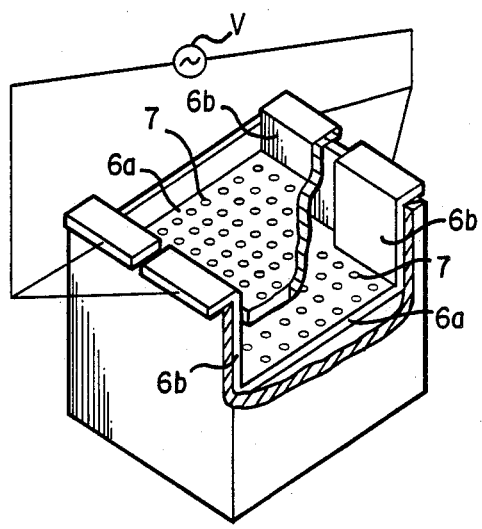
FIG. 7 is a partly cut perspective view of a different embodiment of the glass melting furnace of the present invention.

In the embodiment shown in FIGS. 1 and 2, each of the holes 7 of the plate-like heating portion 6a is circular, but the shape of the hole 7 is not restricted. The shape, number, arrangement, etc. of the holes 7 may be modified so long as the calorific value is uniform over the entire surface of the heating portion 6a of the heating element 6 and the molten glass is not prevented from flowing to the bottom. FIG. 7 shows a different embodiment, wherein two plate-like heating portions 6a are provided vertically away from each other.

Figure 3:
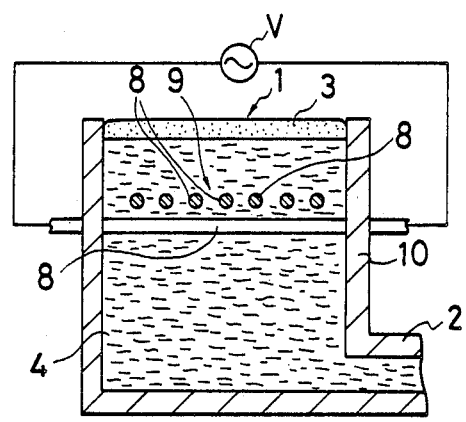
FIG. 3 is a vertical sectional view of another embodiment of a glass melting furnace according to the present invention.
Figure 4:
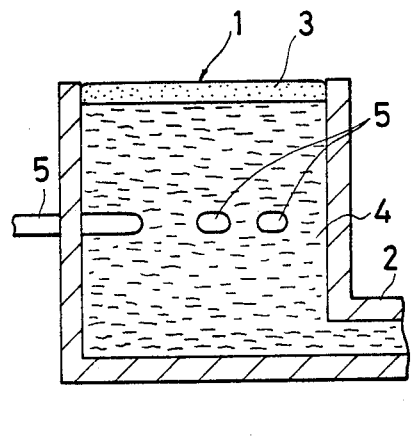
FIGS. 4 to 6 are respectively vertical sectional views of conventional vertical glass melting furnaces.
Figure 5:
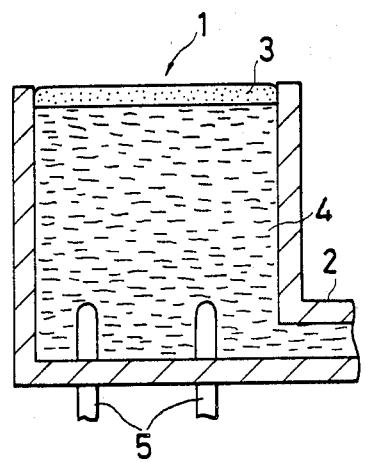
Figure 6:
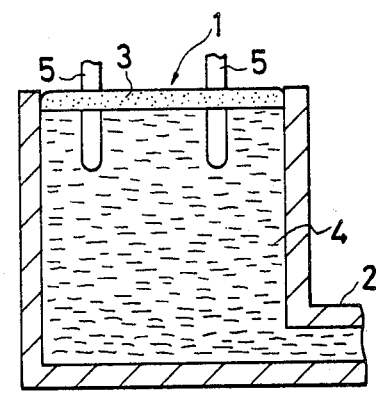
Figure 8:
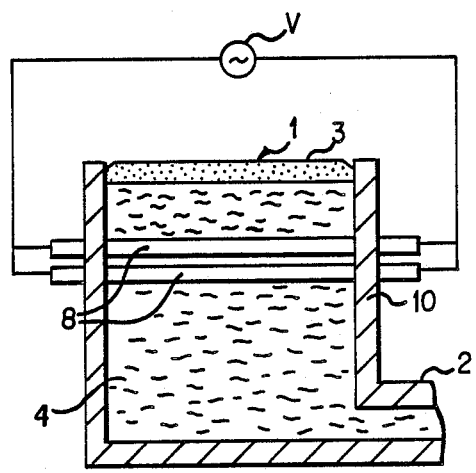
FIG. 8 is a vertical section view of a different embodiment of the glass melting furnace of the present invention.

In a glass melting furnace shown in FIG. 3, a plurality of rod-like heating members 8 are horizontally disposed in parallel to each other as a resistance heating element, and a slit 9 is provided between the respective heating members 8. In this embodiment, the heating members 8 are provided vertically away from each other in such a manner that the horizontal directions of arrangement of the two groups of the heating members 8 are orthogonal to each other. The other structure is the same as in the embodiment shown in FIGS. 1 and 2. This glass melting furnace shown in FIG. 3 also enables the reliable production of clear molten glass in the same way as in the glass melting furnace shown in FIGS. 1 and 2. As shown in FIG. 8, the heating members 8 vertically away from each other may be oriented in the same direction.

The preferable ratio of the area of the holes 7 to the area of the plate-like heating portion 6a of the heating element 6 in the glass melting furnace shown in FIG. 1, the diameter and the number of the rod-like heating members 8, the width of the slit 9 provided between every adjacent heating members 8 and the like in the glass melting furnace shown in FIG. 3 are determined by the amount of glass being melted, the calorific value necessary for melting glass, the electric resistance of the heating element, etc. in consideration of the fluidity of molten glass. If the area of the openings is too large, convection current of molten glass is produced. In such case, it is possible to suppress the convection of the molten glass by providing the heating elements 6 or 8 at plural stages, thereby reducing the substantial opening area.

The ratio $T/S \times 100$ (%) of the area $T$ of the holes 7 (the sum of the areas of the holes 7) to the total area $S$ of the heating element 6 (the product of the length and the width of the heating element 6) is preferably 5 to 60%, more preferably 10 to 40%. When the heating elements 6 are provided at plural stages, the distance between each stage is preferably 20 to 350 mm, more preferably 50 to 200 mm.

When the rod-like heating members 8 are horizontally arranged in parallel to each other at two stages, as shown in FIG. 3, the diameter of the heating member 8 is preferably 30 to 150 mm, more preferably 50 to 75 mm. The distance between the respective heating members 8 (the width of the slit 9) is preferably 30 to 300 mm, more preferably 30 to 150 mm. The distance between the two stages is preferably 20 to 350 mm, more preferably 50 to 200 mm.

In the case of horizontally arranging the rod-like heating members 8 in parallel to each other at only one stage, the diameter of the heating member 8 is preferably 30 to 150 mm, more preferably 50 to 75 mm. The distance between the respective heating members 8 (the width of the slit 9) is preferably 30 to 200 mm, more preferably 30 to 100 mm.

When the rod-like heating members 8 are horizontally arranged in parallel to each other at three stages or more, the diameter, the horizontal distance and the vertical distance of each heating member 8 is substantially the same as in the case of providing the heating elements at two stages.

The vertical position of the furnace at which the heating element is provided is the upper portion of the molten glass 4 and preferably in the vicinity of the batch layer 3. However, if the heating element is too close to the batch layer 3, unmelted glass and/or unrefined glass passes through the openings of the heating element and flows to the bottom portion of the furnace. Accordingly, the heating element (when a plurality of heating elements are provided, the lowermost heating element) is preferably provided at the portion at which the glass is completely molten and does not contain any unmelted substance and bubble.

In ordinary cases, the heating element is preferably provided at a position 3 to 40 cm apart downwardly from the batch layer 3.

A glass melting furnace provided with a heating element at a position deeper than 50 cm from the batch layer reduces the melting rate of a batch because the temperature of the molten glass in the vicinity of the batch layer 3 is lowered. On the other hand, a glass melting furnace provided with a heating element at a position 3 to 40 cm apart downwardly from the batch layer constantly supplies high-quality glass containing no unmelted substance and bubble.

As the material of the resistance heating element in the present invention, platinum, platinum-rhodium alloy, molybdenum, tin oxide or molybdenum covered with platinum, etc. are usable. Among these, platinum and platinum-rhodium alloy are preferable. These materials are advantageous in that since they have much smaller temperature coefficients of the electric resistance as compared with those of glass, the temperature control is very easy.

While there has been described what are at present considered to be preferred embodiments of the invention, it will be understood that various modifications may be made thereto, and it is intended that the appended claims cover all such modifications as fall within the true spirit and scope of the invention.

We claim:

1. A glass melting furnace comprising,
    a furnace body having an upper portion and a bottom portion, a material entrance provided at the upper portion of the furnace body,
    a molten glass exit provided at the bottom portion of the furnace body, and
    a resistance heating element situated in the furnace body between the material entrance and molten glass exit, said resistance heating element extending substantially throughout at least one horizontal level of the furnace body and having openings therein and extending through said heating element with 5–60% of ration $T/S \times 100(\%)$ wherein T is total area of the openings and S is total area of the resistance heating element so that when the furnace is used to melt glass, the resistance heating element is immersed in the glass to melt glass around the resistance heating element and allow molten glass to pass through the openings.

2. A glass melting furnace according to claim 1, wherein the ratio $T/S \times 100(\%)$ of the resistance heating element is 10–40%.

3. A glass melting furnace according to claim 1, wherein the material of said resistance heating element is one selected from the group consisting of platinum, platinum-rhodium alloy, molybdenum, and tin oxide or molybdenum covered with platinum.

4. A glass melting furnace according to claim 1, wherein said heating element is provided at only one horizontal level.

5. A glass melting furnace according to claim 1, wherein a plurality of said heating elements are provided at a plurality of horizontal levels.

* * * * *